US009066022B2

(12) United States Patent
Tuttle

(10) Patent No.: US 9,066,022 B2
(45) Date of Patent: Jun. 23, 2015

(54) METHOD AND SYSTEM OF IMAGE CAPTURE BASED ON LOGARITHMIC CONVERSION

(75) Inventor: John R. Tuttle, Longmont, CO (US)

(73) Assignee: QBIZ, LLC, Wilmington, DE (US)

( * ) Notice: Subject to any disclaimer, the term of this patent is extended or adjusted under 35 U.S.C. 154(b) by 207 days.

(21) Appl. No.: 13/490,555

(22) Filed: Jun. 7, 2012

(65) Prior Publication Data

US 2013/0329084 A1 Dec. 12, 2013

(51) Int. Cl.
*H04N 5/76* (2006.01)
*H04N 5/235* (2006.01)
*H04N 1/40* (2006.01)
*H04N 5/232* (2006.01)
*H04N 5/77* (2006.01)
*H04N 9/82* (2006.01)

(52) U.S. Cl.
CPC .......... *H04N 5/2355* (2013.01); *H04N 5/23229* (2013.01); *H04N 5/772* (2013.01); *H04N 9/8211* (2013.01)

(58) Field of Classification Search
CPC ... H04N 3/1506; H04N 3/155; H04N 5/2355; H04N 5/243
USPC ......... 348/308, 234, 241, 300, 301, 370, 371; 341/156, 155
See application file for complete search history.

(56) References Cited

U.S. PATENT DOCUMENTS

| 4,745,465 | A | * | 5/1988 | Kwon | 358/522 |
| 5,165,071 | A | * | 11/1992 | Moriya et al. | 358/443 |
| 7,126,509 | B2 | | 10/2006 | Sit et al. | |
| 7,227,490 | B2 | * | 6/2007 | Kawahito | 341/156 |
| 7,590,500 | B2 | * | 9/2009 | Jochum et al. | 702/85 |
| 7,645,978 | B2 | * | 1/2010 | Kamon | 250/214 AG |
| 2006/0133546 | A1 | * | 6/2006 | Demir et al. | 375/345 |
| 2006/0158529 | A1 | * | 7/2006 | Katagiri | 348/222.1 |
| 2012/0105587 | A1 | | 5/2012 | Lee et al. | |

OTHER PUBLICATIONS

Maxim Integrated. "Application Note 3611—Integrated DC Logarithmic Amplifiers." http://www.maximintegrated.com/app-notes/index.mvp/id/3611 Sep. 25, 2005. Web. Sep. 27, 2012.
Analog Devices, Inc. "MT-077 Tutorial—Log Amp Basics." http://www.analog.com/static/imported-files/tutorials/MT-077.pdf 2009. Web. Sep. 27, 2012.
Holdenried, Chris D. et al. "A DC-4-GHz True Logarithmic Amplifier: Theory and Implementation." IEEE Journal of Solid State Circuits, vol. 37, No. 10. Oct. 2002.
Analog Devices, Inc. "160 dB Range (100 pA—10 mA) Logarithmic Converter—AD8304." http://www.analog.com/static/imported-files/data_sheets/AD8304.pdf 2002. Web. Sep. 27, 2012.

(Continued)

*Primary Examiner* — Twyler Haskins
*Assistant Examiner* — Padma Haliyur
(74) *Attorney, Agent, or Firm* — Mark E. Scott; Conley Rose, P.C.

(57) ABSTRACT

Image capture based on logarithmic conversion. At least some of the illustrative embodiments are methods including capturing an image by: reading a plurality of analog signals from an array of light sensitive elements; performing logarithmic analog-to-digital conversion on the plurality of analog signals which creates a corresponding plurality of digital values; and storing representations of the plurality of digital values to a storage medium.

18 Claims, 11 Drawing Sheets

(56) References Cited

OTHER PUBLICATIONS

Burr-Brown Products from Texas Instruments. "LOG102—Precision Logarithmic and Log Ratio Amplifier." http://www.ti.com/lit/ds/symlink/log102.pdf 2005. Web. Sep. 27, 2012.

Philips Semiconductors. "Product Specification—True Logarithmic Amplifier—TDA8780M." http://www.classiccmp.org/rtellason/chipdata/tda8780.pdf Jul. 25, 1995. Web. Sep. 27, 2012.

GEC Plessey Semiconductors. Advance Information—SL531—250 MHz True Log IF Amplifier. http://www.ic72.com/pdf_file/s/591829.pdf 2001. Web. Sep. 27, 2012.

Chengdu AINFO Inc. "Detector Log Video Amplifier (DLVA)." http://www.ainfoinc.com/en/p_mwrf_dlva.asp Jan. 12, 2011. Web. Sep. 27, 2012.

Analog Devices, Inc. "120 dB Range (3 nA—3 mA) Dual Logarithmic Converter—ADL5310." http://www.analog.com/static/imported-files/data_sheets/ADL5310.pdf 2004. Web. Sep. 28, 2012.

Analog Devices, Inc. "Fast, Voltage-Out DC—440 MHz, 95 dB Logarithmic Amplifier—AD8310." http://www.datasheetcatalog.org/datasheet2/3/06dwykgyweoc1s3rtptuc7lprpfy.pdf 2004. Web. Sep. 28, 2012.

Analog Devices, Inc. "DC-Coupled Demodulating 120 MHz Logarithmic Amplifier—AD640." http://www.analog.com/static/imported-files/data_sheets/AD640.pdf 1999. Web. Sep. 28, 2012.

"Analog-to-digital converter." Wikipedia.org. May 30, 2012. Web. Jun. 7, 2012.

Larson, Greg Ward. "Radiance File Formats." http://radsite.lbl.gov/radiance/refer/filefmts.pdf n.d. Web. May 30, 2012.

"IEEE 754-2008." Wikipedia.org. May 30, 2012. Web. May 30, 2012.

"RGBE image format." Wikipedia.org. Apr. 12, 2011. Web. May 30, 2012.

Arvo, James "Graphics Gems II", Program of Computer Graphics Cornell University, Ithaca, NY, 1991.

Ward, Gregory, "The LogLuv Encoding for Full Gamut, High Dynamic Range Images", Silicon Graphics, Inc. Moutain View, CA, 1998.

Choubey, Bhaskar et al. Models for Pixels With Wide-Dynamic-Range Combined Linear and Logarithmic Response, IEEE Sensors Journal, vol. 7, No. 7, Jul. 2007.

* cited by examiner

METHOD AND SYSTEM OF IMAGE CAPTURE BASED ON LOGARITHMIC CONVERSION

BACKGROUND

Since the advent of photography, in many cases the dynamic range of a scene's luminance that a photograph can capture has been significantly less than the range of luminance perceived by human eyes directly viewing the same scene. Adjustments to the shutter speed, aperture, and film "speed" may help adjust the exposure to adequately capture the portions of the scene (e.g., the person under the umbrella at the beach), but other portions of the scene (e.g., in the beach example, the ocean behind subject) may be over exposed and thus carry little, if any, detail. The limitation regarding dynamic range occurs not only with cameras that utilize film, but also digital cameras that store images as digital files.

BRIEF DESCRIPTION OF THE DRAWINGS

For a detailed description of example embodiments, reference will now be made to the accompanying drawings in which.

NOTATION AND NOMENCLATURE

Figure 1:
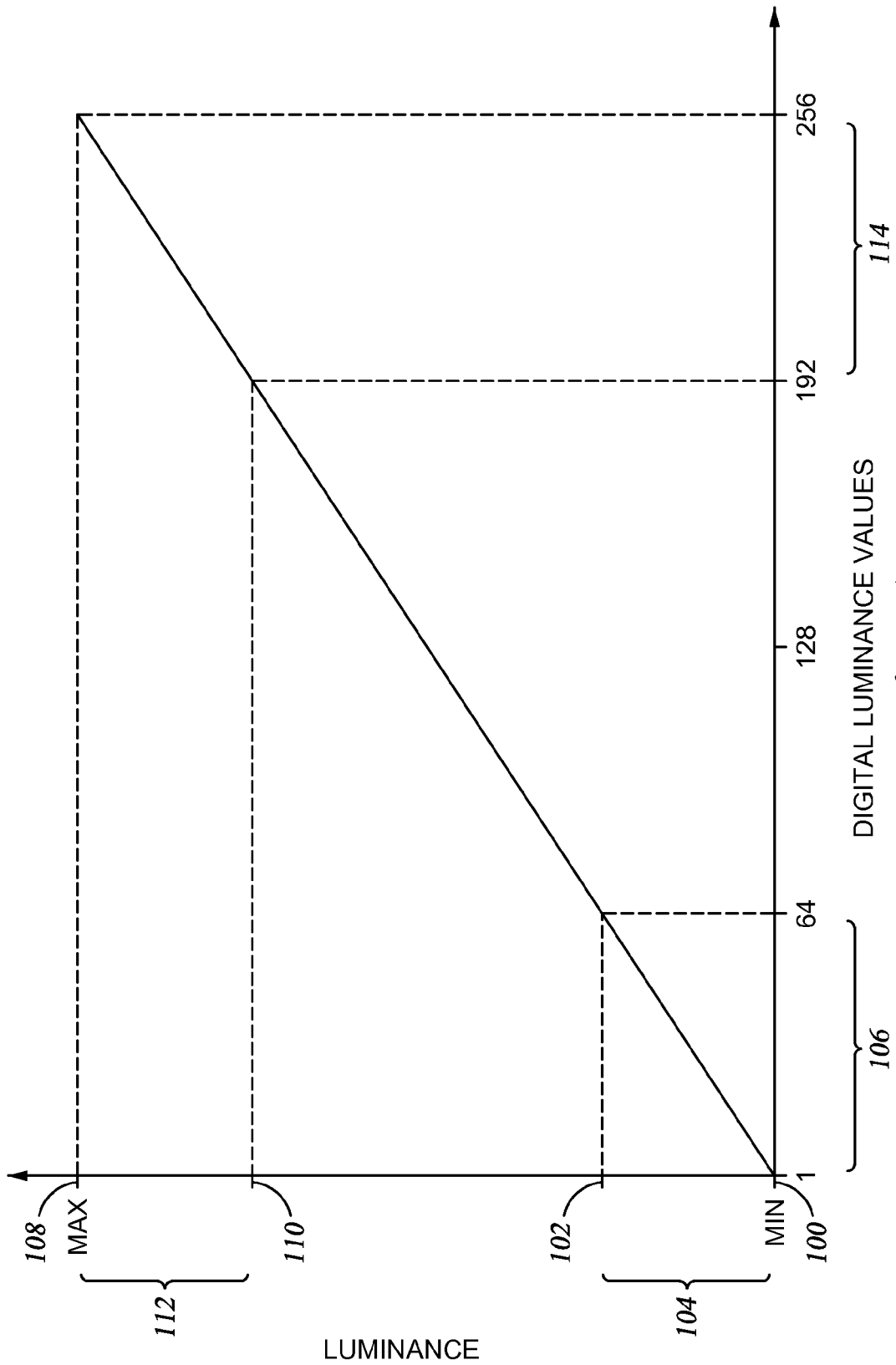
FIG. 1 shows a plot of luminance against digital luminance values.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection.

"Logarithmic analog-to-digital conversion" shall mean that, for a plurality of analog input signals converted, a respective plurality of digital values are produced where the digital values are logarithmically related to the respective plurality of analog input signals. Creating a plurality of digital values linearly related to analog input signals and later modifying the plurality digital values to have a logarithmic relationship shall not be considered "logarithmic analog-to-digital conversion".

"Logarithmic analog-to-digital converter" shall mean a device or combination of devices that, for a plurality of analog input signals applied to the device(s), a respective plurality of digital values are produced where the digital values are logarithmically related to the respective plurality of analog input signals. A device that creates a digital value linearly related to an analog input signal in combination with later modifying the digital values to a logarithmic relationship shall not be considered a "logarithmic analog-to-digital converter". Moreover, incremental changes inherent in binary representation of a continuous function shall not obviate the status as logarithmic analog-to-digital converter. Moreover, localized departure from a logarithmic response (e.g., upper end of a conversion range, lower end a conversion range, temperature dependent changes) shall not obviate status as logarithmic analog-to-digital converter.

"Linear analog-to-digital converter" shall mean a device or combination of devices that produce a digital value that is linearly related an analog input signal. Incremental changes inherent in binary representation of a continuous function shall not obviate the linearity of a linear analog-to-digital conversion. Moreover, localized non-linearity (e.g., upper end of a conversion range, lower end a conversion range, temperature dependent changes) shall not obviate status as linear analog-to-digital conversion.

"Octave" shall mean a unit of measure corresponding to a range of intensities (e.g., perceived brightness, voltage, or measured photons), but octave shall not imply any relationship to or number of steps of a set of numbers that may reside within the octave or the number of octaves over the entire range of interest.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to imaging systems, such as mobile devices (e.g., wireless network enabled devices), mobile cellular devices, digital cameras, scanners, and copiers. The various embodiments were developed in the context of digital cameras, and the description that follows is based on the developmental context; however, the concepts described are equally applicable to other image capture devices, and thus the developmental context shall not be read as a limitation as to the scope of the claims below. Moreover, so as not to unduly complicate the presentation of the information regarding the various example embodiments, initially the specification is limited to black and white imaging and images.

Identifying Shortcomings of the Related-Art

Part of understanding why the example embodiments represent an advance in imaging system technology is an understanding of the shortcomings of related-art systems. In particular, both film cameras and digital cameras available prior to the current specification convert luminance of a scene linearly. In the case of film cameras, photons of light interacting with light sensitive film elements linearly record luminance. In the case of digital cameras the conversion of analog signals from each pixel of an array of light sensitive elements is a linear conversion to a digital value. The balance of this discussion will be limited to digital cameras with the understanding that the same issues arise in the film camera context.

"Linear" in the context of the identifying the shortcomings of related-art systems indicates that each digital representation of a luminance value is related to the analog signal created by each pixel of an array of light sensitive elements in a straight line sense. That is, each digital value is related to the corresponding analog signal according to the equation:

$$\text{VALUE}_{DIGITAL} = M^*(\text{ANALOG VALUE}) + \text{OFFSET} \quad (1)$$

where $\text{VALUE}_{DIGITAL}$ is the encoded digital value representation, M is gain value, ANALOG VALUE is the analog signal created by a pixel in the array of light sensitive elements, and OFFSET is an offset value.

Thus, digital representations of luminance in related-art systems are linearly related to luminance of the scene. As an example, consider an imaging system that uses an 8-bit linear analog-to-digital converter, such that digital luminance values for the illustrative system may span the binary range $\{00000000 \rightarrow 11111111\}$ which in decimal is $\{0 \rightarrow 255\}$ (to avoid divide by zero issues, apparent brightness will be considered to span the decimal range $\{1 \rightarrow 256\}$). Further consider that in an example captured image the lowest luminance pixel in the captured image takes the value 1 and the highest luminance pixel in the captured image takes the value 256. Thus, using linear conversion of luminance the entire luminance range of the captured image may be considered to be divided into 256 equally space steps along the range, in this example.

FIG. 1 shows a graph of the relationship between luminance (Y-axis) and the digital luminance values (X-axis) in this example situation. In particular, for any luminance value (Y-axis), the corresponding digital luminance value (X-axis) is linearly related as shown. Consider, for purposes of explanation, two luminance values, one being the minimum luminance (reference number 100 in the figure), and the second being luminance (reference number 102 in the figure), separated by a difference (reference number 104 in the figure). The difference 104 as between the two illustrative luminance values 100 and 102 results in an incremental change (reference number 106 in the figure) in the digital luminance value. In the illustrative case of 8 bit linear analog-to-digital conversion, the example difference 104 results in a change of decimal 64 in the digital luminance value. Now consider the same magnitude of difference in luminance at the upper end of the luminance spectrum. That is, consider two luminance values, one being the maximum luminance (reference number 108 in the figure), and the second being luminance (reference number 110 in the figure), separated by a difference (reference number 112 in the figure) having the same magnitude as difference 104. The difference 112 as between the two illustrative luminance values 108 and 110 results in an incremental change 114 in the digital luminance value. In the illustrative case of 8-bit linear analog-to-digital conversion, the example difference 112 results in a change of decimal 64 in the digital luminance value (i.e., the difference between 192 and 256). Given the linear relationship between luminance and digital luminance values, and since the magnitude of the differences 104 and 112 are the same in this example, so too are the magnitudes of the incremental changes 106 and 114 within the digital luminance values. The specification now turns to how humans perceive brightness.

Humans perceive changes in brightness non-linearly, and the relationship is approximately logarithmic. Consider, for example, a digital image created using the 8-bit analog-to-digital conversion discussed above. If digital luminance values are applied to a display device, human perception views the difference of luminance from a value of decimal 1 to decimal 2 as a doubling of brightness; however, the next doubling of brightness is decimal 4 (2*2), not a decimal 3 (2+1). Likewise, the next doubling of brightness is decimal 8 (4*2), and so on. On the upper end of the digital luminance values in the example, human perception views the difference of luminance from a value of decimal 128 to decimal 256 as a doubling brightness.

A bit more precisely then, human perception of change of brightness follows the Weber-Fechner law for apparent brightness, defined mathematically as:

$$B = k^* \ln(L/L_0) \quad (2)$$

where B is the change in apparent brightness to a human observer, k is a constant, L is the just-observable change in luminance, and $L_0$ is the background luminance (or, previous luminance). Letting k equal 1, and applying the values described above with respect to the system performing 8-bit analog-to-digital conversion, the change in apparent brightness as between digital luminance values of decimal 1 and decimal 2 is $B = \ln(2/1) = 0.693$. Again with k equal 1, the change in apparent brightness as between digital luminance values of decimal 128 and decimal 256 is $B = \ln(256/128) = 0.693$. The precise value 0.693 is of little consequence, but note that the change in apparent brightness in the two example situations is exactly the same in spite of the number of steps between the respective analyzed values.

Figure 2:
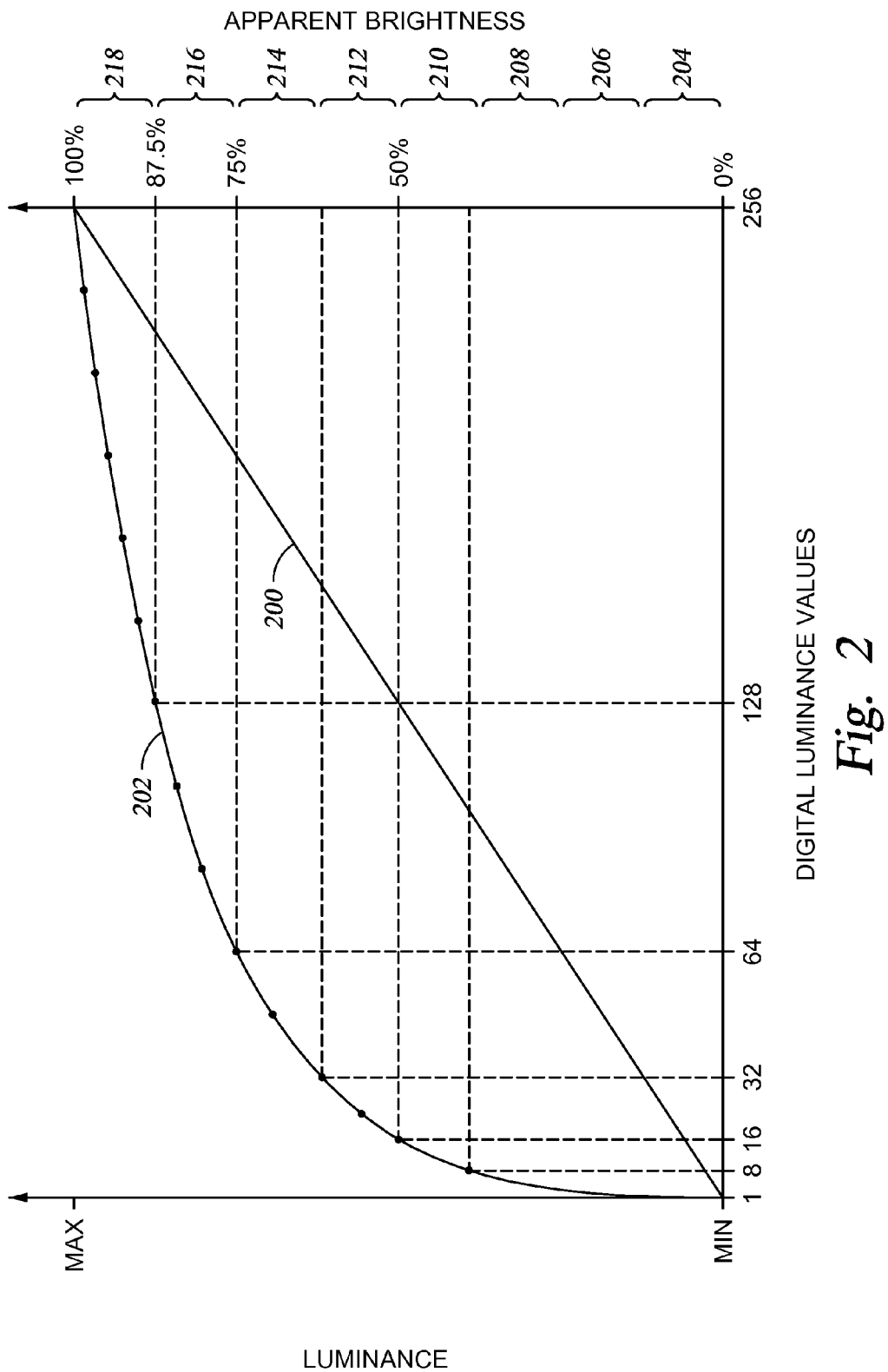
FIG. 2 shows a plot of luminance against digital luminance values, and also apparent brightness against digital luminance values.

The inventor of the present specification has found that the linear analog-to-digital conversion used in related-art imaging systems considered with the human's logarithmic perception of brightness degrades image quality by storing or recording too much information in the higher luminance ranges, and too little information in the lower luminance ranges. In order to highlight this point, FIG. 2 is presented, which helps graphically illustrate at least some shortcomings of related-art systems. In particular, FIG. 2 relates a luminance range (Y-axis on the left) against the range of possible digital luminance values (X-axis, illustratively ranging from 1 to 256) by way of solid line 200, where the relationship is linear. Co-plotted on the same graph is human perception of brightness (Y-axis on the right (with an arbitrary scale of 0 to 100%)) with respect to the digital luminance values (again, the X-axis) by way of dash-dot-dash line 202. Thus, as with respect to FIG. 1, FIG. 2 illustrates a linear relationship between luminance and the digital luminance values by way of line 200. However, FIG. 2 also shows the human perception of brightness by way of line 202 against the range of possible digital luminance values, and that the relationship between the digital luminance values and the apparent brightness is non-linear, and in fact is logarithmic.

By performing linear analog-to-digital conversion, the related-art imaging systems store too much information with respect to the higher luminance ranges, and too little information with respect to the lower luminance ranges. Again, human perception views the change in luminance between a decimal 128 value and a decimal 256 value as doubling of brightness. Thus, as shown in the illustrative case of FIG. 2, half the bit width of the digital luminance values in this example populates the range of the highest 12.5% (87.5% to 100%) of the apparent brightness—half the bit width encodes changes in what a human may perceive as pure white. The remaining 128 decimal values—the lower half the bit width of the digital luminance values in this example—populates the range of the lowest 87.5% of the apparent brightness.

Stated in terms of granularity or quantization between doubling of apparent brightness, the difference in brightness as perceived by a human of a pixel having a decimal 128 value and a pixel having a decimal 256 value will be a doubling of apparent brightness, in this case with 128 gradations between. The difference in brightness as perceived by a human of a pixel having a decimal 64 value and a pixel having a decimal 128 value will be a doubling of apparent brightness, with 64 gradations between. The difference in brightness as perceived by a human of a pixel having a decimal 32 value and a pixel having a decimal 64 value will be a doubling of apparent brightness, with 32 gradations between. The difference in brightness as perceived by a human of a pixel having a decimal 16 value and a pixel having a decimal 32 value will be a doubling of apparent brightness, with 16 gradations between. The difference in brightness as perceived by a human of a pixel having a decimal 8 value and a pixel having a decimal 16 value will be a doubling of apparent brightness, with 8 gradations between. The difference in brightness as perceived by a human of a pixel having a decimal 4 value and a pixel having a decimal 8 value will be a doubling of apparent brightness, with 4 gradations between. The difference in brightness as perceived by a human of a pixel having a decimal 2 value and a pixel having a decimal 4 value will be a doubling of apparent brightness, with 2 gradations between. Finally, the difference in brightness as perceived by a human of a pixel having a decimal 1 value and a pixel having a decimal 2 value will be still be a doubling of apparent brightness.

The information discussed in the immediately previous paragraph is reproduced in the table form below:

TABLE 1

| START VALUE | STOP VALUE | QUANTIZATION |
| --- | --- | --- |
| 1 | 2 | 1 |
| 2 | 4 | 2 |
| 4 | 8 | 4 |
| 8 | 16 | 8 |
| 16 | 32 | 16 |
| 32 | 64 | 32 |
| 64 | 128 | 64 |
| 128 | 256 | 128 |
| | Total | 256 |

Notice how the granularity within each doubling of brightness gets smaller at the lower luminance range.

In order to help quantify the difference between the related-art systems and the various example embodiments discussed below, the range of apparent brightness in FIG. 2 is logically divided into eight equally spaced divisions or "octaves" (labeled octave 204, 206, 208, 210, 212, 214, 216, and 218) where the divisions are based on doubling in apparent brightness. While in the example situation of an 8-bit linear analog-to-digital conversion nicely divides into eight octaves, any number of octaves may be chosen (e.g., ten octaves). Thus, octave 218 represents the highest or brightest octave, and octave 204 represents the lowest or most dim octave.

While each illustrative octave represents a doubling of apparent brightness, FIG. 2 also shows that the granularity or quantization within each octave is overloaded in the upper octaves. Thus, for example, pixels in octave 218 can have any of 128 possible digital luminance values. Pixels in octave 216 can have any of 64 possible digital luminance values. Jumping to the lowest octave 204, pixels in octave 204 can have only a value of decimal 1 or a value of decimal 2. Thus, even though the human eye can perceive a great number of shades of gray (or color) within each octave (e.g., 512 or more), very little information is stored in the lower octaves in comparison to the upper octaves. Table 2 immediately below is similar to Table 1 above, but also includes the octave information (the reference number for each octave shown parenthetically).

TABLE 2

| OCTAVE | START VALUE | STOP VALUE | QUANTIZATION |
| --- | --- | --- | --- |
| 1 (204) | 1 | 2 | 1 |
| 2 (206) | 2 | 4 | 2 |
| 3 (208) | 4 | 8 | 4 |
| 4 (210) | 8 | 16 | 8 |
| 5 (212) | 16 | 32 | 16 |
| 6 (214) | 32 | 64 | 32 |
| 7 (216) | 64 | 128 | 64 |
| 8 (218) | 128 | 256 | 128 |
| | | Total | 256 |

Thus, too much information is encoded with respect to the upper luminance ranges (the upper octaves), and too little is encoded with respect to the lower luminance ranges (the lower octaves).

Wider A/D Conversion does not Address the Problem

One approach in the imaging system industry to obtain higher resolution images is merely to use a "wider" linear analog-to-digital conversion. For example, rather than use an 8-bit linear analog-to-digital conversion, one approach in the imaging industry is use of 12-bit linear analog-to-digital conversion, or perhaps a 16-bit linear analog-to-digital conversion. However, even a wider linear analog-to-digital conversion does not fully address the issue.

Assume for purposes of explanation that a digital camera manufacturer wishing to store data with greater resolution modifies a camera system to have a 16-bit linear analog-to-digital conversion rather than the 8-bit linear analog-to-digital conversion used in the example above. There are a host of problems that would dissuade a camera manufacturer from making a switch to a 16-bit linear analog-to-digital conversion, not the least of which are increased price, increased power requirements resulting in shorter battery life, as well as serious questions as to whether 16-bit linear analog-to-digital conversion could operate quickly enough to be used in a camera device. Notwithstanding these issues, consider FIG. 3, which is similar to FIG. 2, except based on use of a 16-bit linear analog-to-digital conversion.

Figure 3:
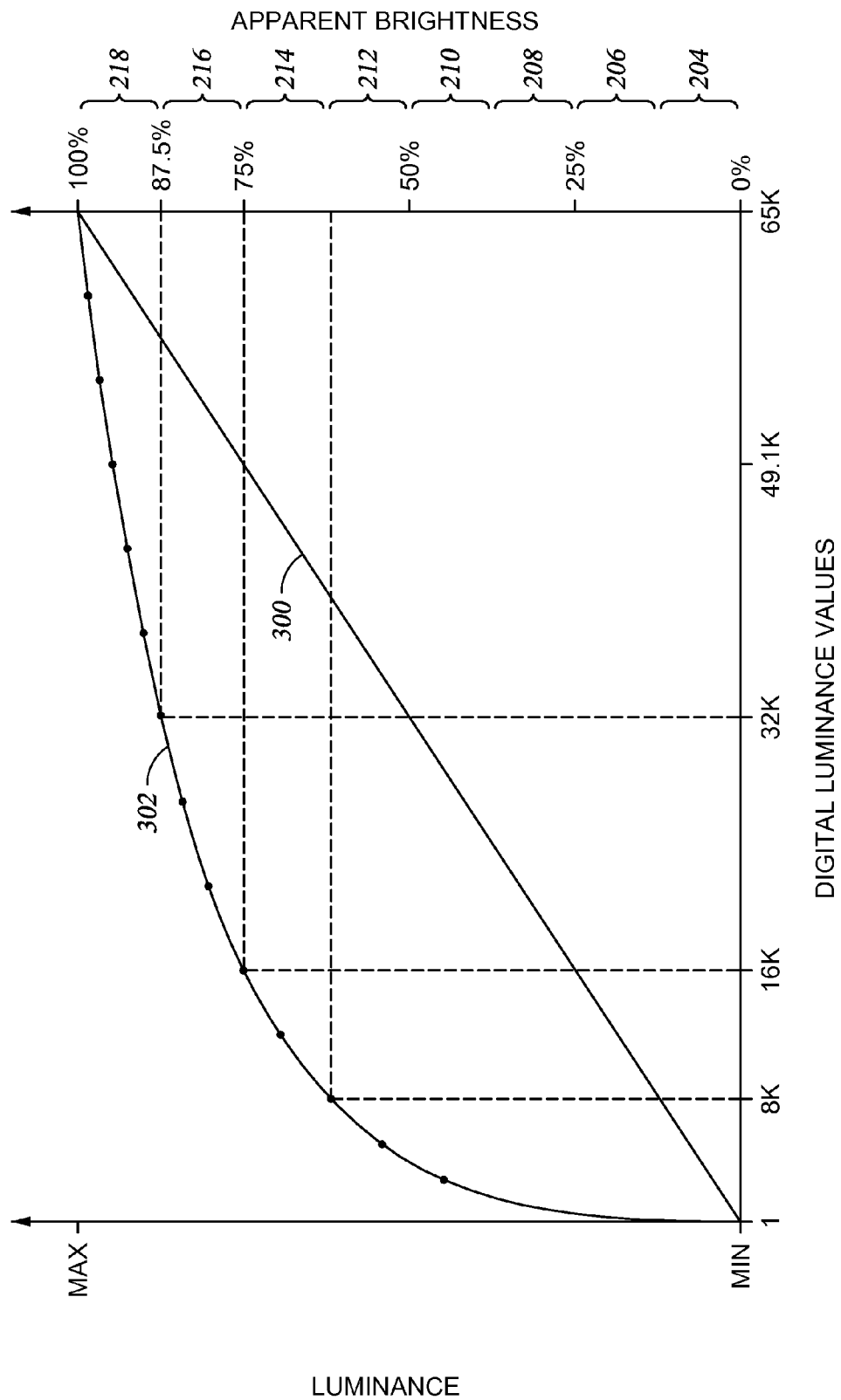
FIG. 3 shows a plot of luminance against digital luminance values, and also apparent brightness against digital luminance values.

In particular, FIG. 3 shows luminance range (Y-axis on the left) against the range of possible digital luminance values (X-axis, illustratively ranging from 1 to 65,536) by way of solid line 300, where the relationship is linear. Co-plotted on the same graph is human perception of brightness (Y-axis on the right (with an arbitrary scale of 0 to 100%)) with respect to the digital luminance values (again, the X-axis) by way of dash-dot-dash line 302. Thus, as with respect to FIG. 2, FIG. 3 illustrates a linear relationship between luminance and the digital luminance values by way of line 300. However, FIG. 3 also shows the human perception of brightness by way of line 302 against the range of possible digital luminance values, and again that the relationship between the digital luminance values and the apparent brightness is non-linear.

For the same luminance range as between FIG. 2 and FIG. 3, the human perception of brightness will not change. Thus, line 302 is the same as in FIG. 2, and the octave assignments (along the right Y-axis) remain the same. It follows that, under these assumptions, human perception views the change in luminance between a decimal 32,768 value and a decimal 65,536 value as doubling of brightness. As shown in the illustrative case of FIG. 3, half the bit width of the digital luminance values in this example (32,768 decimal values) populates upper most octave 218. Stated in terms of granularity or quantization between doubling of apparent brightness, the difference in brightness as perceived by a human of a pixel having a decimal 32,768 value and a pixel having a decimal 65,536 value (octave 218) in this example will be a doubling of apparent brightness, in this case with 32,768 gradations between. The difference in brightness, as perceived by a human, of a pixel having a decimal 16,384 value and a pixel having a decimal 37,768 value (octave 216) will be a doubling of apparent brightness, with 16,384 gradations between. Skipping to the lower most octave, the difference in brightness as perceived by a human of a pixel having a decimal 1 value and a pixel having a decimal 2 value (octave 204) will be a doubling of apparent brightness. Thus, even if 16-bit linear analog-to-digital conversion could be used in the example camera system, the 16 bit conversion still overloads storage in the upper octaves, and stores too little information in the lower octaves. No amount of post-processing can recover information for illustrative octave 204—the information is simply not recorded.

One additional point is made with reference to FIG. 3, which ties in with aspects later presented. The mathematical center of the digital luminance values in linear analog-to-digital conversion is not the center of the apparent brightness scale—the mathematical center is in the upper octaves of the apparent brightness. For example, if one assumes that for a particular image captured the lowest digital luminance value is a decimal 1, and the highest digital luminance value is a decimal 65,536, the average of the two values is about 32,768. For the example situation of eight zones and the image captured spanning the entire dynamic range of the linear analog-to-digital conversion, the average or mathematical center of the digital luminance values is not the center or midpoint of the apparent brightness. Rather, the example 32,768 average value resides at or very near the upper most octave 218.

Example Embodiments

Figure 4:
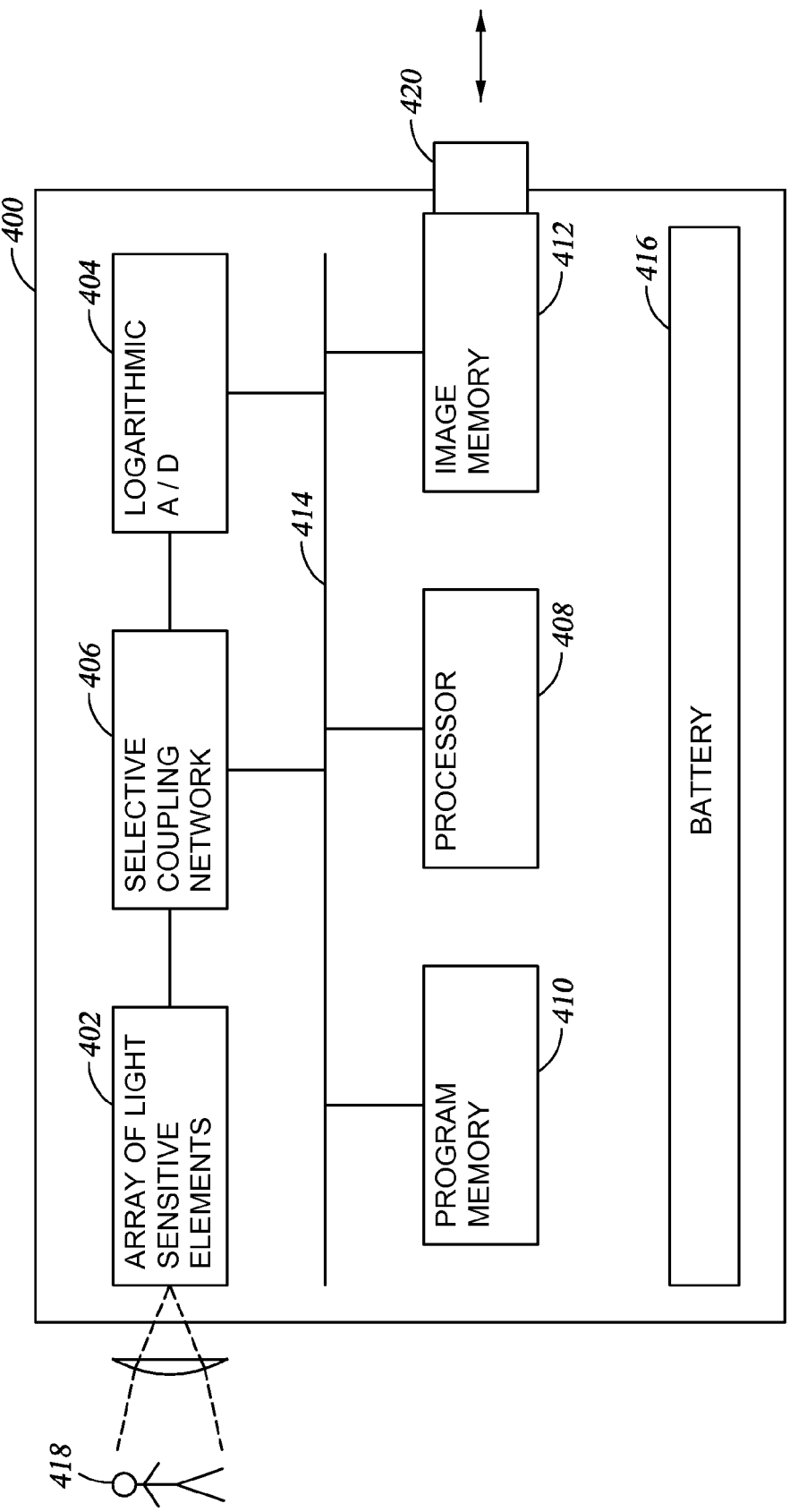
FIG. 4 shows, in block diagram form, an imaging system in accordance with at least some embodiments.

The issues noted above are addressed, at least in part, by use of logarithmic analog-to-digital conversion. FIG. 4 shows, in block diagram form, a system in accordance with at least some embodiments. In particular, FIG. 4 shows an imaging system 400, which may be illustrative of any device which captures and stores images, such as mobile cellular device, a digital camera, a scanner, and a copier. The imaging system 400 comprises an array of light sensitive elements 402 coupled to a logarithmic analog-to-digital conversion system 404 by way of a selective coupling network 406. The imaging system further comprises processor 408 coupled to a program memory 410 and an image memory 412 by way of a communication bus 414. In cases where the imaging system 400 is a portable device, the imaging system 400 may further comprise a battery 416. The electrical connections of the battery 416 to the various other components of the imaging system 400 are omitted so as not to unduly complicate the figure.

The array of light sensitive elements 402 may take any suitable form for capturing representations of a scene or image, such as the illustrative person 418. In some cases, the array of light sensitive elements 402 may be an array of charge coupled devices (CCD), where each pixel in the array receives photons, and converts the photons to an analog signal (e.g., voltage or current). Thus, considering the example CCD array as a whole, the CCD array creates a plurality of analog signals indicative of the luminance of a portion of the scene or image to which the CCD array is exposed. In yet still other cases, the array of light sensitive elements 402 may be an array of complementary metal-oxide semiconductor devices (CMOS, also known as an Active Pixel Sensor (APS)), where each pixel in the array receives photons, and converts the photons to an analog signal. As before, considering the example APS array as a whole, the APS array creates a plurality of analog signals indicative of the luminance of a portion of the scene or image to which the APS array is exposed.

Still referring to FIG. 4, the array of light sensitive elements 402 couples to the logarithmic analog-to-digital conversion system 404 by way of a selective coupling network 406. In particular, to capture an image, the analog signal created by each pixel in the array needs to be read and converted to a digital value. The selective coupling network 406 thus acts to selectively couple, in some cases sequentially through the array, the analog signal created by each pixel to the logarithmic analog-to-digital conversion system 404. The selective coupling network may take any suitable form, such as a single analog multiplexer, or a series of analog multiplexers. In some cases, the selective coupling network 406 receives commands regarding which pixel in the array of light sensitive elements 402 to couple to the logarithmic analog-to-digital conversion system 404 from processor 408. In other cases, the selective coupling network 406 may receive a "start" command from the processor, and sequentially step through the pixels in a predefined order in a predefined period of time.

Logarithmic analog-to-digital conversion system 404 couples on an analog side to the selective coupling network 406, and couples on a digital side to the processor by way of the communication network 414. Various example embodiments of the logarithmic analog-to-digital conversion system 404 are discussed in greater detail below, but for now consider that the system 404 comprises a circuit or combination of circuits such that, for each analog signal coupled to the system 404 by way of the selective coupling network 406, the logarithmic analog-to-digital conversion system 404 produces a digital value that is logarithmically related to the analog signal. In particular, the logarithmic analog-to-digital conversion system 404 may create digital values based on analog input signals according to Equation 3:

$$\text{VALUE}_{DIGITAL} = \text{Log}_B(\text{ANALOG VALUE}) + \text{OFFSET} \quad (3)$$

where $\text{VALUE}_{DIGITAL}$ is the encoded digital value representation, ANALOG VALUE is the analog signal created by a pixel in the array of light sensitive elements, B is base of the logarithm, and OFFSET is an offset value.

Still referring to FIG. 4, processor 408, executing instructions, controls various aspects of the imaging system 400. The processor 408 may be any suitable processor, such as a standalone processor, a microcontroller, a signal processor, state machine, or an application specific integrated circuit (ASIC) specially designed for image capture operations. For example, in some cases the processor may be a Part No. ATMega328P-PU microcontroller available from Atmel Corporation of San Jose, Calif. In some cases, the instructions executed by the processor 408 may be stored in a program memory 410 which may be a non-volatile memory device, such as read-only memory (ROM), electrically erasable programmable ROM (EEPROM), or flash memory. The processor may have a working memory to which programs are copied for execution, or the processor may execute the instructions directly from the program memory.

The illustrative imaging system 400 further comprises an image memory 412 coupled to the processor 408. As the name implies, the image memory 412 may be the location to which digital images are stored. In some cases, the processor 408 may read the digital values from the logarithmic analog-to-digital conversion system 404 and write the values to the image memory, but in other cases the digital values may be directly written through a direct memory access (DMA) system. In many cases, the image memory 412 may comprise a removable memory card or stick 420, such that the images captured may be transferred to other devices. The image memory 412 may thus comprise any suitable removable memory system or device, such as a Secure Digital (SD) card memory.

Figure 5:
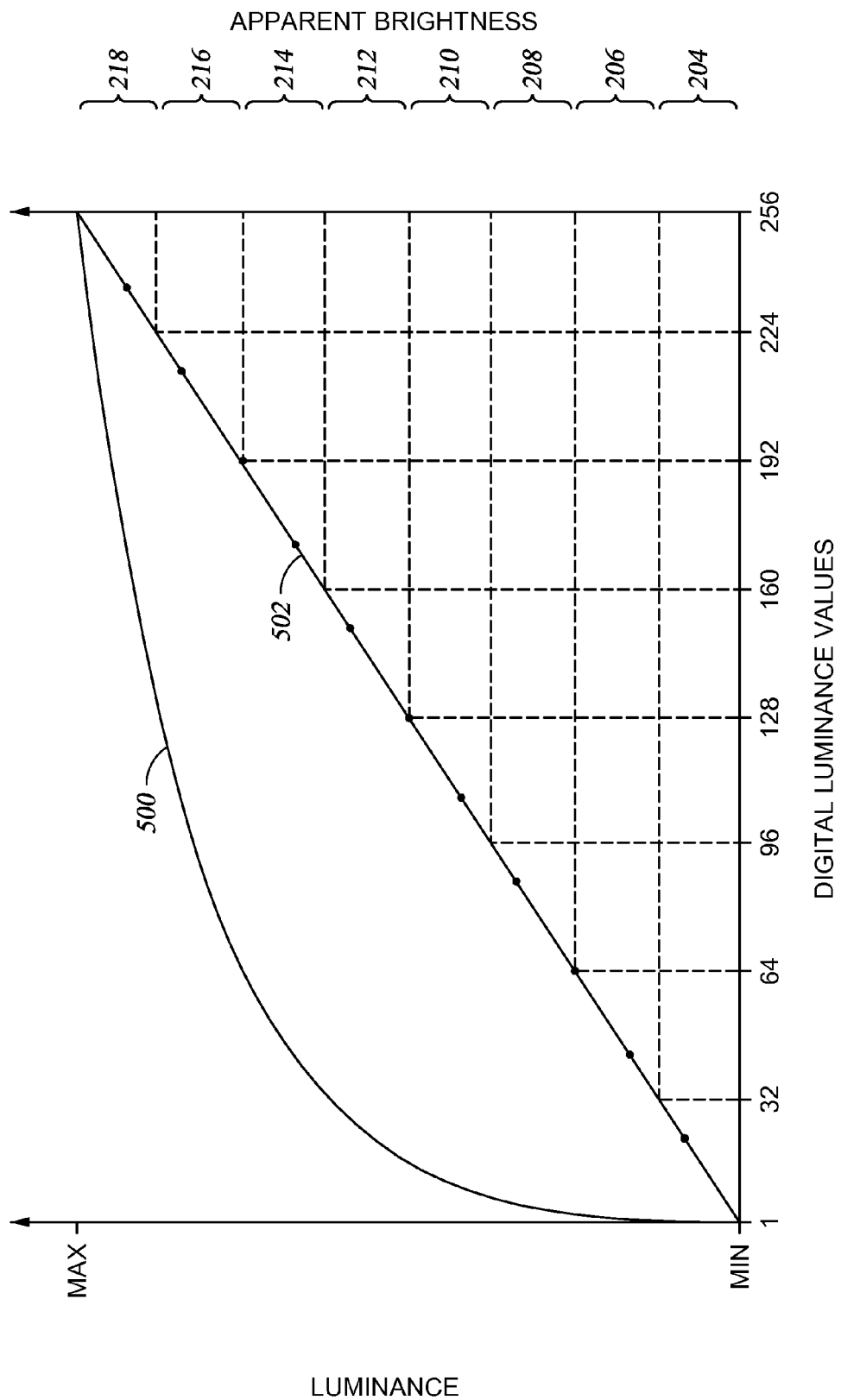
FIG. 5 shows a plot of luminance against digital luminance values, and also apparent brightness against digital luminance values, in accordance with at least some embodiments.

Having now described the illustrative imaging system 400, the specification turns to a description of operation using the logarithmic analog-to-digital conversion system 404, and how such operation addresses, at least in part, the issues noted with respect to the related-art systems. In particular, FIG. 5 shows a graph relating a luminance range (Y-axis on the left) against the range of possible digital luminance values (X-axis) by way of solid line 500 for an example 8-bit logarithmic analog-to-digital conversion (thus, the digital values range from 1 to 256). Co-plotted on the same graph is human perception of brightness (Y-axis on the right (with an arbitrary scale of 0 to 100%)) with respect to the digital luminance values (again, the X-axis) by way of dash-dot-dash line 502. Further, the graph of FIG. 5 shows the illustrative octaves 204, 206, 208, 210, 212, 214, 216, and 218.

Thus, FIG. 5 illustrates a logarithmic relationship between luminance and the digital luminance values by way of line 500. FIG. 5 also shows the human perception of brightness by way of line 502 against the range of possible digital luminance values taking into account the logarithmic analog-to-digital conversion. By performing logarithmic analog-to-digital conversion, the information regarding luminance is better distributed within each illustrative octave. Again considering human perception of brightness, given the logarithmic analog-to-digital conversion, the change in luminance between a decimal 224 value and a decimal 256 value will be viewed as a doubling of brightness, with 32 gradations between them. The difference in brightness as perceived by a human of a pixel having a decimal 192 value and a pixel having a decimal 224 value will be a doubling of apparent brightness, in this case with 32 gradations between. Skipping to the lower octaves, the difference in brightness as perceived by a human of a pixel having a decimal 32 value and a pixel having a decimal 64 value will be a doubling of apparent brightness, with 32 gradations between. Finally, the difference in brightness as perceived by a human of a pixel having a decimal 1 value and a pixel having a decimal 32 value will be a doubling of apparent brightness, with 32 gradations between.

While each illustrative octave represents a doubling of apparent brightness, FIG. 5 also shows that the granularity or quantization within each octave is evenly distributed about the octaves. Table 3 immediately below shows the information of the immediately previous paragraph in table form.

TABLE 3

| OCTAVE | START VALUE | STOP VALUE | QUANTIZATION |
|---|---|---|---|
| 1 (204) | 1 | 32 | 32 |
| 2 (206) | 32 | 64 | 32 |
| 3 (208) | 64 | 96 | 32 |
| 4 (210) | 96 | 128 | 32 |
| 5 (212) | 128 | 160 | 32 |
| 6 (214) | 160 | 192 | 32 |
| 7 (216) | 192 | 224 | 32 |
| 8 (218) | 224 | 256 | 32 |
|  |  | Total | 256 |

Thus, the various embodiments more evenly distribute the quantization across the octaves from a granularity standpoint as related to human perception. Table 4 shows, for the example eight octaves and 8-bit analog-to-digital conversion, how the linear and logarithmic conversions compare.

TABLE 4

| OCTAVE | QUANTIZATION (LINEAR) | QUANTIZATION (LOGARITHMIC) |
|---|---|---|
| 1 | 1 | 32 |
| 2 | 2 | 32 |
| 3 | 4 | 32 |
| 4 | 8 | 32 |
| 5 | 16 | 32 |
| 6 | 32 | 32 |
| 7 | 64 | 32 |
| 8 | 128 | 32 |
| Total | 256 | 256 |

With respect to post-processing, in this example there is insufficient data until one reaches the sixth octave in the linear systems to recreate the granularity in the corresponding octaves in the logarithmic system.

Wider Effective Capture Range

The specification now turns to the concepts of dynamic range of capture. An image on a sunny day at the beach, with the image comprising a person perched beneath the shade of an umbrella, has a very wide dynamic range of luminance. The example situation of a scene with both beach and shade may have a dynamic range of 160 decibels (dB). By contrast, an imaging system with 10-bit linear analog-to-digital conversion theoretically has a 60 dB capture range ($2^{10}=1024$, and $20 \log(1024)=60$ dB), though currently available arrays of light sensitive elements may have a capture range approaching, if not meeting, 160 dB. From the study above, however, it is clear that in spite of the theoretical range of a 10 bit linear analog-to-digital conversion, in actuality the effective range is less as caused by the under quantization in the lower octaves. Table 4 above suggests that roughly half the octaves are under quantized, making the effective dynamic range of linear analog-to-digital closer to about 30 dB. Table 5 shows a relationship between a linear analog-to-digital conversion and logarithmic analog-to-digital conversion for a 10-bit system and 8 octaves to highlight again the effective breadth of the image capture for wider conversion systems.

TABLE 5

| OCTAVE | QUANTIZATION (LINEAR) | QUANTIZATION (LOGARITHMIC) |
|---|---|---|
| 1 | 1 | 128 |
| 2 | 8 | 128 |

TABLE 5-continued

| OCTAVE | QUANTIZATION (LINEAR) | QUANTIZATION (LOGARITHMIC) |
|---|---|---|
| 3 | 16 | 128 |
| 4 | 32 | 128 |
| 5 | 64 | 128 |
| 6 | 128 | 128 |
| 7 | 256 | 128 |
| 8 | 512 | 128 |
| Total | 1024 | 1024 |

If you consider that somewhere between 64 and 128 quantization steps within each octave is the subjective point where degradation becomes noticeable to an ordinary viewer, Table 5 thus highlights again that the effective dynamic range for the linear conversion is about half (arguably less than half given the 64 quantization steps in illustrative zone 5) that of the logarithmic conversion.

In Camera Contrast Control

The specification now turns to contrast and brightness control in accordance with at least some embodiments. As an aid in discussing the concepts of contrast and brightness control, attention is directed to FIG. 6 which plots digital luminance values (Y-axis) against luminance across the entire visual range (X-axis in a logarithmic scale). In particular, dashed line 600 plots the relationship between digital luminance values against luminance if the bit width of the digital luminance values was sufficient to capture the entire visual luminance range. However, for purposes of this portion of the discussion, assume that the bit-width of the digital luminance values is insufficient to capture the entire luminance range. In particular, consider that the bit width of the digital luminance values is limited to the magnitude of range 604 of solid line 602. Various camera controls may be implemented to shift line 602 as desired by the camera operator. For example, by controlling shutter speed (exposure time of the scene to the array of light sensitive elements) the position of line 602 may be shifted parallel to dashed line 600. For example, slower shutter speeds resulting longer exposure time make the resultant image more sensitive to the lower luminance ranges (i.e., shift line 602 down the slope of dashed line 600), with the higher luminance ranges potentially overexposed. Likewise, faster shutter speeds resulting in shorter exposure time make the resultant image less sensitive to the lower luminance ranges (i.e., shift the line 600 up the slope of dashed line 600), with the lower luminance ranges potentially underexposed.

Figure 7:
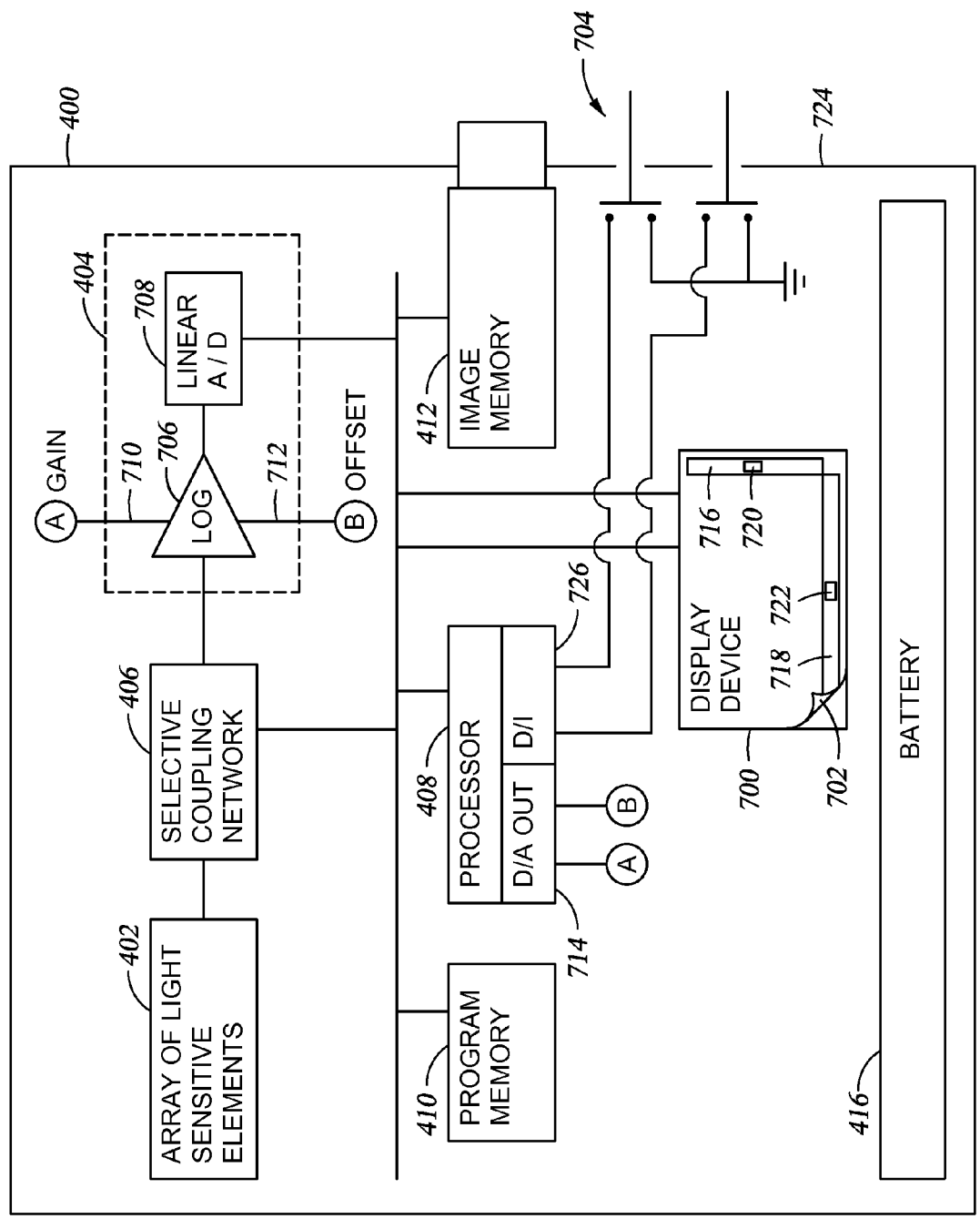
FIG. 7 shows, in block diagram form, an imaging system in accordance with at least some embodiments.

However, in accordance with at least some embodiments additional controls may be implemented, the additional controls in the form of contrast control and brightness control. FIG. 7 shows, in block diagram form, the imaging system 400 in greater detail in some respects, and with additional illustrative components. In particular, FIG. 7 shows an illustrative implementation of the logarithmic analog-to-digital conversion system 404, as well as a display device 700 comprising a touchscreen overlay 702 (as shown by a raised corner), and externally accessible switches 704. Each will be addressed in turn, and then the functionality of contrast and brightness control in relation to the various devices will be discussed.

The logarithmic analog-to-digital conversion system 404 in FIG. 7 is illustratively implemented as an amplifier 706 coupled on an input side to the array of light sensitive devices 402 and coupled on an output side to an analog-to-digital converter 708. The amplifier 706 in accordance with these embodiments has a gain response that is logarithmic (e.g., Part No. AD8304, available from Analog Devices, Inc. of Norwood, Mass.), and the analog-to-digital converter 708 has a linear response (e.g., Part No. LTC2480 16-bit A/D converter available from Linear Technologies of Milpitas, Calif.). That is, the output signal of the amplifier 706 is logarithmically related to the input signal. Amplifier 706 may further have control inputs, such as a gain control 710 and a bias or offset control 712. In some cases, the gain control 710 and offset control 712 are analog inputs, and in the illustrative imaging system the gain control and offset control are coupled to a digital-to-analog output portion 714 of the processor 408 (such as when the processor 408 is a microcontroller or ASIC). In other cases, the analog values may be created by a digital-to-analog converter distinct from the processor 408, yet communicatively coupled to both the processor 408 and the amplifier 706. In other cases, the gain and offset of the amplifier 706 may be controlled by way of a digital control signal or signals, and thus the processor 408 may couple to the amplifier by way of a digital communication bus. Regardless of the precise mechanism by which the processor, executing instructions, controls the gain and/or offset of the amplifier, how such control affects the operation of the imaging system is discussed after discussing the display device 700.

The example imaging system 400 of FIG. 7 further comprises a display device 700 coupled to the processor 408 such that various images and interfaces may be displayed. The display device 700 may be any suitable display device, such as a liquid crystal display (LCD) or plasma display. In some embodiments, the display device 700 may be overlaid with a touchscreen overlay 702 (e.g., a capacitive touch screen overlay) such that a user of the imaging system 400 can interact with the instructions executing on the computer system by way of the touchscreen overlay 702 and display device 700. As an example of such interaction, the example display device 700 is shown to display two slider bars 716 and 718. Thus, by interacting with the slider bars (such as by moving block 720 up or down) various functionalities may be implemented, such as changing brightness. Likewise, by interacting with the slider bars (such as by moving block 722 left or right) various functionalities may be implemented, such as changing contrast.

However, in other cases the user may interact with the programs executing on the processor by way of physical buttons accessible on the outside cover 724 of the imaging system, such as illustrative externally accessible switches 704. In particular, the illustrative externally accessible switches 704 couple to the processor 408 by way of digital inputs 726 of the processor 408 (such as when the processor 408 is a microcontroller or ASIC). In other cases, the digital values may be read by a digital input device distinct from the processor 408, yet communicatively coupled to both the processor 408 and the externally accessible switches 704. While illustrative externally accessible switches 704 are shown as two normally open pushbutton devices, other types and number of externally accessible switches may be used.

Figure 6:
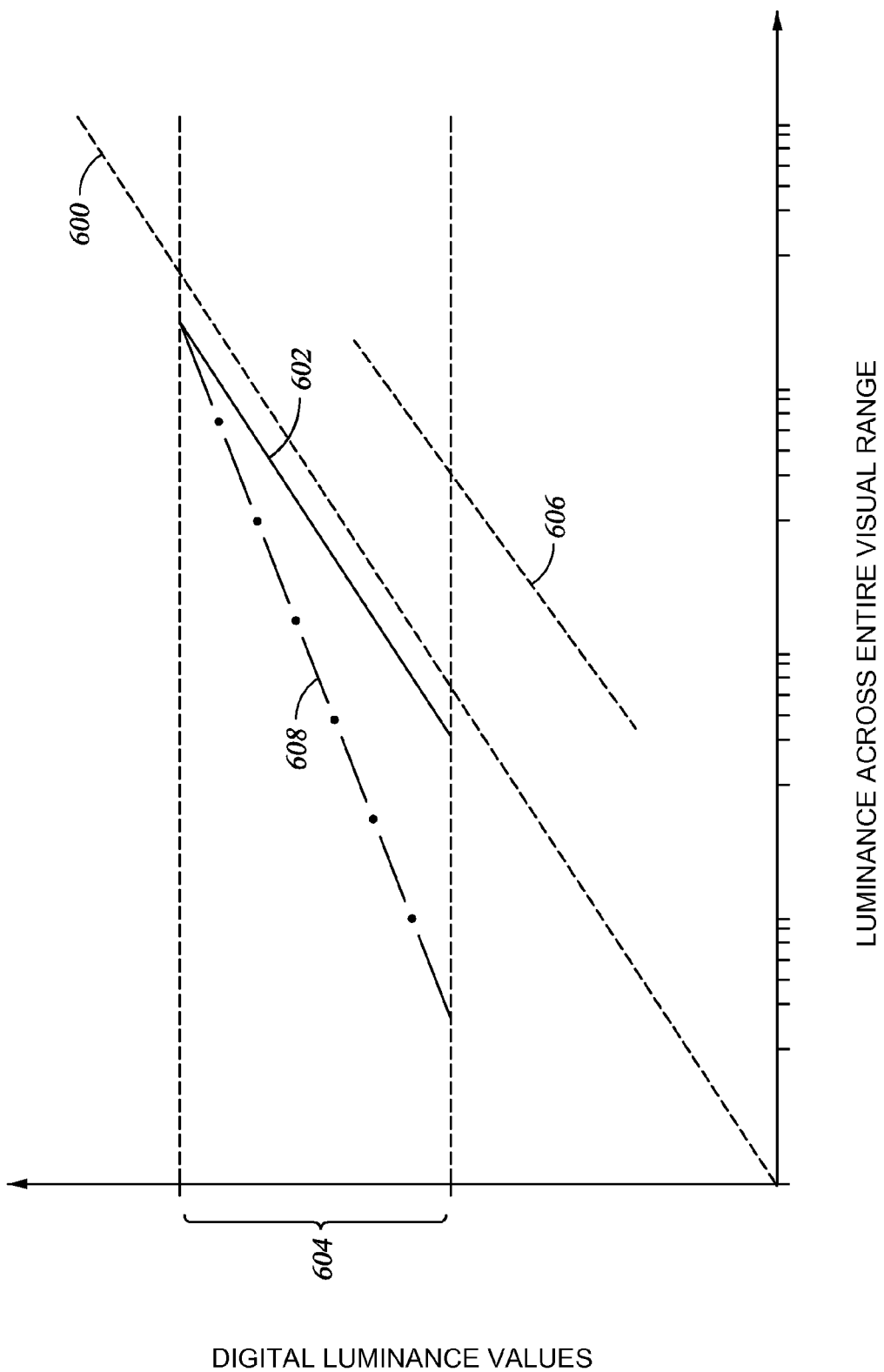
FIG. 6 shows a plot of digital luminance values against luminance (log) in accordance with at least some embodiments.

Referring to FIGS. 6 and 7 simultaneously, in accordance with at least some embodiments, the processor (executing instructions) selectively controls contrast and/or brightness. For example, by controlling the signal provided to the offset control 712, the processor may control brightness of the recorded scene. The brightness control in relation to FIG. 6 is a shifting of line 602 up or down. For example, by lowering the offset of the amplifier 706, the relationship of the digital luminance values to the luminance may be shifted downward, as shown by dashed line 606. Likewise, by raising the offset of the amplifier 706, the relationship of the digital luminance values to the luminance may be shifted upward (not specifically shown). Notice how the magnitude of the range 604 stays the same in spite of the shifting (i.e., the projection of the line 602 against the Y-axis has range 604, and the projection of the line 606 against the Y-axis has a range of the same magnitude). Thus, a relatively dark scene may be captured "lighter" if desired, and a relatively bright scene may be captured "darker" if desired.

Further, by controlling the signal provided to the gain control 710, the processor may control contrast of the recorded scene. The contrast control in relation to FIG. 6 is a changing of the slope of line 602 to be greater (closer to vertical, or lesser (closer to horizontal). Considered more mathematically, and considering again Equation (3) above, changing the contrast is effectively a change in the base B of the logarithm conversion. For example, by lowering the gain of the amplifier 706, the relationship of the digital luminance values to the luminance may be shifted such that a greater luminance range is capture within the range of the digital luminance values, as shown by dashed-dot-dash line 608. Such a shift results in fewer gradations within each octave (the octaves not specifically shown). Likewise, by raising the gain of the amplifier 706, the relationship of the digital luminance values to the luminance may be shifted such that a lesser luminance range is captured within the range of the digital luminance values (not specifically shown). Such a shift results in a greater number of gradations within each octave. Notice how the magnitude of the range 604 stays the same in spite of the shifting (i.e., the projection of the line 602 against the Y-axis has range 604, and the projection of the dash-dot-dash line 608 against the Y-axis has a range of the same magnitude). Thus, a scene with a relatively narrow dynamic range (e.g., cloudy day) may be captured with greater quantization within each octave, if desired. Likewise a relatively bright scene (e.g., sunny day) may be more broadly captured across the dynamic range of the scene with lesser quantization within each octave, if desired.

In some cases, the contrast and/or brightness control is implemented based on commands received from the user of the imaging system 400. For example, as a precursor to capturing an image for storage to the image memory, the imaging system 400 may be configured to capture images and display the images on the display device (e.g., a view-finder functionality). As part of capturing the initial image, the imaging system 400 may enable the user to make contrast and brightness control adjustments, such as by interacting with the slider bars 716 and/or 718, by interacting with the externally accessible switches 704, or both. Interacting with the interface devices results in changes to the gain and offset (i.e., contrast and brightness, respectively). Once the user has adjusted contrast and/or brightness as desired, the final image may be captured and stored to the image memory 412.

In yet still other embodiments, adjustments to contrast and/or brightness may be made by a program executing on the processor 408 without user input. In particular, by performing logarithmic analog-to-digital conversion an automatic system for contrast and/or brightness may be implemented. In the "automatic" adjustment example, the imaging system 400 may capture an initial image (that may or may not be shown on the display device) with each of the contrast and brightness at a predefined "center" or midrange setting. The processor 408 may analyze the initial image to determine the dynamic range of the image, and may adjust the contrast and/or brightness based on the dynamic range, again without user input. For example, the processor 408 may locate within the initial image the pixel having the lowest digital luminance value, and the pixel having the highest digital luminance value. An initial key value (e.g., average of the highest and lowest luminance values) may be determined, and the brightness (offset) may be adjusted such that the key value of the final image resides at or near a predetermined value. Note that as discussed with respect to FIG. 3 above, related-art systems using linear analog-to-digital conversion could not use the mathematical center of the digital luminance values, as the average or mathematical center in those systems turns out to reside in the upper luminance octaves. As yet another example, the processor 408 may locate within the initial image the pixel having the lowest digital luminance value and the pixel having the highest digital luminance value, and from the determined digital luminance values calculate a dynamic range (e.g., based on a difference between the highest and lowest digital luminance values). The contrast (gain) may then be adjusted such that the dynamic range of the analog-to-digital conversion more closely matches the dynamic range of the scene to be capture for the final image, again without user input.

Full Range Capture

The adjustments to the contrast and/or brightness work for any bit width of the digital luminance values; however, adjustments may be performed with greater accuracy if the entire dynamic range of the scene is captured in the initial image. Performing logarithmic analog-to-digital conversion enables capturing the entire dynamic range of a scene with a relatively narrow bit width analog-to-digital conversion. Consider, again, a beach scene with a person perched beneath an umbrella, and thus the scene spanning approximately the entire 160 dB visual range of human perception. If an 11-bit logarithmic analog-to-digital conversion is performed, 2048 total gradations are possible. If the illustrative 160 dB scene is logically broken into 10 octaves, each octave thus has just over 200 gradations or quantization steps. Further considering that "good" image reproduction is possible with 128 or more gradations or steps within each octave, the entire 160 dB scene captured with an 11-bit logarithmic analog-to-digital conversion gives better than "good" granularity—200 quantization steps per octave—across the entire 160 dB scene. Thus, in some example systems, no contrast and/or brightness control is needed as the imaging system captures the entire dynamic range every time.

However, not every image capture will need to have a dynamic range spanning the entire 160 dB visual range of human perception. In the beach example, the user may—for style reasons only—want to capture the person perched beneath the umbrella and may not want high fidelity image capture of the surf behind the person. In the case of scenes illuminated with indoor lighting, the dynamic range of the scene may be significantly less than the 160 dB. However, the ability to at least initially capture the entire 160 dB visual range of human perception, or at least ability to capture a dynamic range than wider than the actual scene, may be helpful in performing contrast and/or brightness control. Consider, as an example, that the processor 408 captures an initial image, and from the initial image determines that the scene spans something less than the entire 160 dB range of the array of light sensitive devices and/or logarithmic analog-to-digital conversion. The processor may then adjust the contrast (gain) and the brightness (span) such that capture range of the logarithmic analog-to-digital conversion is co-extensive with the scene. Stated otherwise, with the contrast and brightness set such that the at least the entire dynamic range of a scene can be capture within the initial image, the processor 408 may analyze the initial image (which may or may not be shown on the display device 700) to determine the darkest digital luminance value and the lightest digital luminance value, and adjust the contrast and gain such that the adjusted dynamic range of the logarithmic analog-to-digital conversion matches that of the actual scene (or perhaps is slightly larger). The result is that the number of gradations or quantization steps within each octave of the captured image is higher than the full range image capture.

It follows from the discussion that many of the parameters of photography can be eliminated from the camera. The mechanical shutter and shutter speed control (whether mechanical or electro-mechanical) are not strictly required in digital cameras, as the exposure time control can be implemented electronically in how long the array of light sensitive devices elements are exposed to a scene after reset and before the analog signals are read. High end digital cameras may implement mechanical shutters and shutter speed control as a mechanism to supply visual effects to an image, but in other systems the mechanical shutter and shutter speed controls may be omitted such that the imaging system does not have a mechanical shutter or mechanical shutter speed control. It is noted that an electronic "shutter" (e.g., zeroing the CCD/APS array voltages just prior to capture of the image) may still be used. Likewise, aperture control need not be present, but may find use in higher-end cameras to facility certain visual effects in the capture images. Moreover, the idea of "film speed" or ISO is eliminated, particularly in systems where full range image capture is performed and/or the contrast and/or brightness are adjustable to match the visual range of the scene. Stated otherwise, some imaging system in accordance with at least some embodiments do not implement a "film speed" or ISO control.

Other Example Linear A/D Conversion Systems

Figure 8:
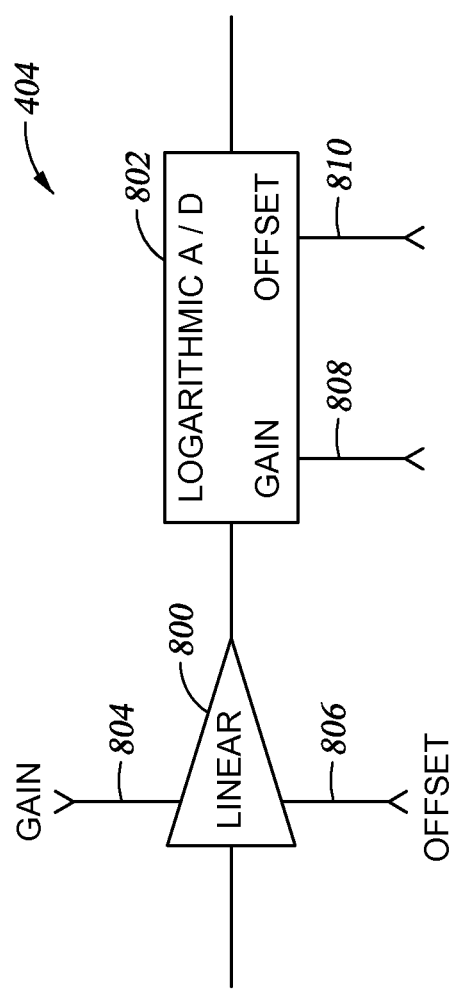
FIG. 8 shows, in block diagram form, a portion of an imaging system in accordance with at least some embodiments.

The specification to this point has expressly illustrated a logarithmic analog-to-digital conversion, and shown one possible implementation of a logarithmic analog-to-digital conversion in FIG. 7. However, further logarithmic analog-to-digital conversion systems are also possible. FIG. 8 shows a circuit diagram of another example embodiment of a logarithmic analog-to-digital conversion system 404 in accordance with further embodiments. In particular, FIG. 8 shows a linear amplifier 706 (e.g., Part No. LMC6001 amplifier available from Texas Instruments, Inc. of Dallas, Tex.) coupled on an input side to the array of light sensitive devices 402 (not specifically shown in FIG. 8) and coupled on an output side to a logarithmic analog-to-digital converter 802. The amplifier 800 in accordance with these embodiments has a gain response that is linear (see equation (1) above and related discussion). That is, the output signal of the amplifier 800 is linearly related to the input signal. Amplifier 706 may further have control inputs, such as a gain control 804 and a bias or offset control 806. In some cases, the gain control 804 and offset control 806 are analog inputs coupled to a digital-to-analog output portion of the processor 408 (not specifically shown in FIG. 8). In other cases, the analog values may be created by a digital-to-analog converter distinct from the processor 408, yet communicatively coupled to both the processor 408 and the amplifier 800. In other cases, the gain and offset of the amplifier 800 may controlled by way of a digital control signal or signals, and thus the processor 408 may couple to the amplifier by way of a digital communication bus. Regardless of the precise mechanism by which the processor, executing instructions, controls the gain and/or offset of the amplifier, the gain and offset may be controlled as discussed above.

The logarithmic analog-to-digital converter 802 in accordance with these embodiments has a response that is logarithmic. That is, the digital output values created by the logarithmic analog-to-digital converter 802 are logarithmically related to the input signal. Thus, the combination of the linear amplifier 800 and logarithmic analog-to-digital converter 802 may be used to implement some or all the various embodiments discussed above.

Still referring to FIG. 8, in further cases, a logarithmic analog-to-digital converter 802 may itself have a gain input signal 808 and/or an offset signal 810, which, if present, couple to the processor 408 similarly to the gain and offset discussed with the respect to amplifier 706 and 800. Thus, the contrast (gain) control may be implemented in whole or in part by controlling the gain of the logarithmic analog-to-digital converter 802, and the brightness (offset) control may be implemented in whole or in part by controlling the offset of the logarithmic analog-to-digital converter 802.

Color Systems

The various embodiments discussed to this point have been in relation to black and white capture systems so as not to unduly complicate the description. However, the various embodiments are equally applicable to color systems. In particular, color systems may be implemented in a variety of ways. For example, in some cases in a grouping of light sensitive elements (e.g., three abutting light sensitive elements in the array) each light sensitive element may be associated with a color filter such that each light sensitive element is responsive to a single color of light. One light sensitive element may be responsive only to red light, one light sensitive element may be responsive only to green light, and light sensitive element may be responsive only to blue light. Thus, the luminance values in this example are each associated with a particular color.

In other cases, multiple arrays of light sensitive elements 402 may be present, with a set of optics such that each array is exposed to the scene, and each array is filtered for a single color (e.g., red, green, and blue). In the multiple array case, there may be multiple logarithmic analog-to-digital conversion systems 404, one each for each color. In yet still other cases, the array of light sensitive elements 402 may be a Bayer array comprising a pseudo random distribution of color sensitivity (e.g., a small dot of filter material over each light sensitive element to make the element sensitive to only one color). The logarithmic analog-to-digital conversion discussed in this specification works equally well in color systems.

File Format

In accordance with at least some embodiments, each digital value created by the logarithmic analog-to-digital conversion system 404 may be stored to the image memory 412, such as a series of digital values starting with a pixel in the upper left corner of the scene, and working along each row until reaching the lower right hand corner of the scene. In the case of color images, additional bits may be included to designate the color associated with each digital value. For example, for a 10-bit wide logarithmic analog-to-digital conversion system, each digital value may be 10 bits, with an associated color 2-bit color indication, for a total of 12 bits for each pixel.

However, in other embodiments the file format may take advantage of the use of octaves. In particular, in some embodiments the digital values in the image memory 412 are stored as a value indicative of octave (which may also be referred to as a radix), a value indicative of graduation or quantization within the octave (the graduation may also be referred to as a mantissa), and a value indicative of a color. Consider, for example, a 10-bit logarithmic analog-to-digital conversion having eight octaves. As discussed with respect to Table 5, there are 128 graduations or quantization steps within each of the illustrative octaves. Storing the digital values in this example thus involves, for each digital luminance value, storing a 3-bit indication of octave ($2^3=8$), a 7-bit indication of graduation or quantization within the octave ($2^7=128$), and a 2-bit indication of color.

Many times particular areas within an image (e.g., along a portion of the same horizontal scan line) may have luminance values within the same octave. By storing digital values based on octave and gradation within the octave, for groups of pixels within the same octave the bits related to octave may be omitted. For example, consider a file storage format where, as a default, each digital value comprises a value indicative of color, followed by a value indicative of octave, and then followed by a value indicative of gradation within the octave. For systems using red, green, and blue, of the four states for the two bits designated for the value indicative of color, one state is unused (e.g., if binary 00 designates red, binary 01 designates blue, and binary 10 designates green, and thus binary 11 is unused). In the example system, when a series digital luminance values all reside within the same octave, the unused "color" value may be inserted into the file along with an indication of the octave, and an indication of the number of subsequent pixels to which the octave applies. For the next number of designated pixels, only the color bits and the mantissa may be written to the file, omitting the octave.

Consider a more specific example of omitting the values indicative of octave. In particular, consider a scene comprising the horizon on a sunny, blue sky day with no clouds. Further consider that in the example image that the top scan line of an image is all blue, and that the shades of blue on the scan line all reside in the same octave. In the example system, the programs writing the image to the image memory may determine that the entire line of pixels resides within the same octave. The first value written may be a "repeat" indication (e.g., a value 11 in the "color" designation) followed by an indication of octave and a number of predetermined bit-width indicative of how many pixels that follow reside within the same octave. If the scan line is 1024 pixels wide, the predetermined number may be 10 bits wide. The next digital value may omit the value indicative of octave.

Piecewise Logarithmic A/D Conversion

The various embodiments discussed to this point have assumed a single analog-to-digital converter that directly, or in combination with other components, performs logarithmic analog-to-digital conversion. However, in other embodiments the logarithmic analog-to-digital conversion may be a piecewise logarithmic analog-to-digital conversion where no specific component has a logarithmic relationship input-to-output, but as whole creates an approximation of a logarithmic analog-to-digital conversion.

Figure 9:
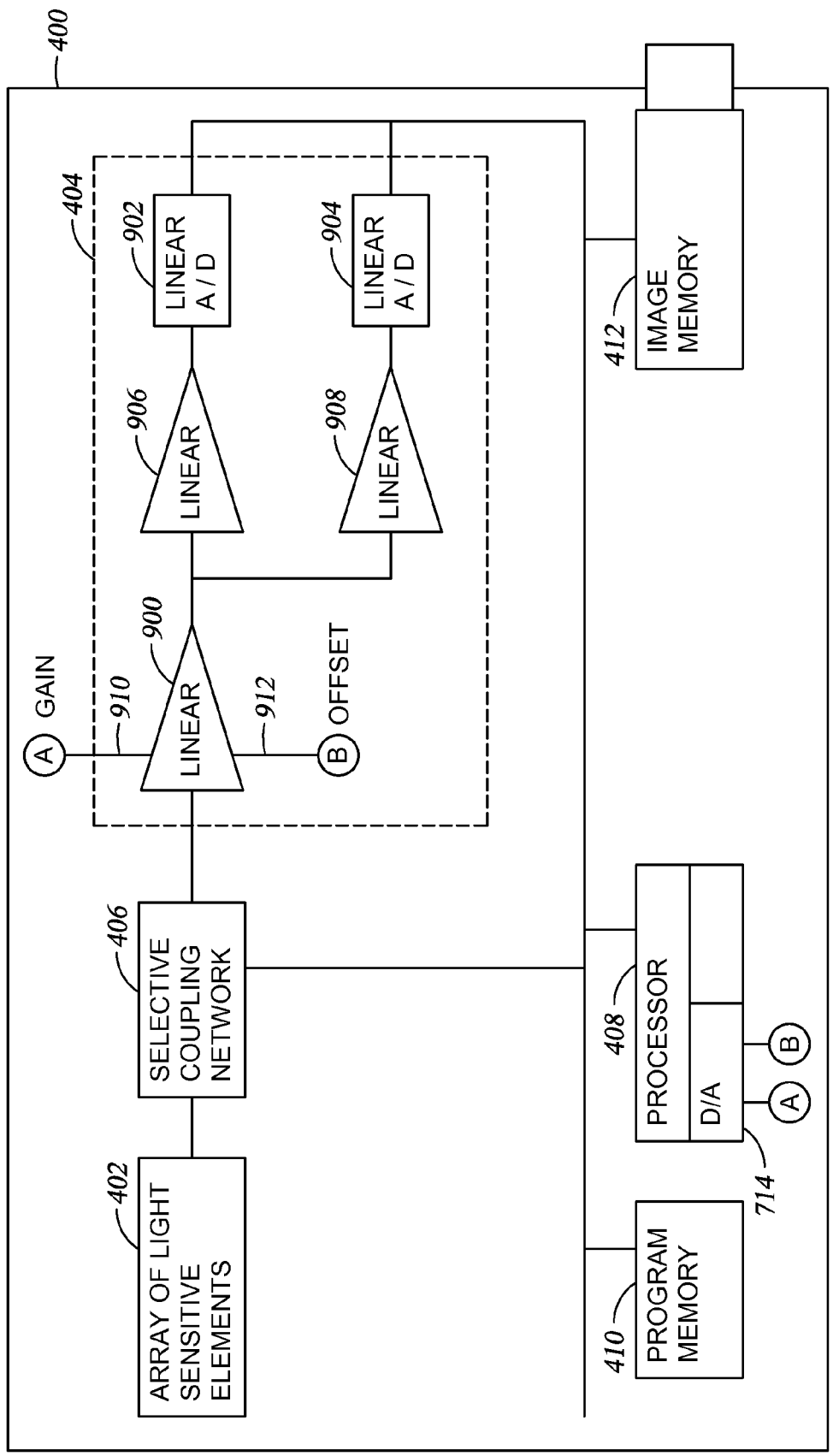
FIG. 9 shows, in block diagram form, an imaging system in accordance with at least some embodiments.

FIG. 9 shows, in block diagram form, the imaging system 400 with alternative illustrative components. In particular, FIG. 9 shows an illustrative implementation of the logarithmic analog-to-digital conversion system 404 (here in the form of a piecewise logarithmic analog-to-digital conversion), as well as a representative grouping of other components previously discussed. Components previously discussed, and whose operation does not change with respect to previous embodiments, will not be reintroduced here.

The logarithmic analog-to-digital conversion system 404 in FIG. 9 is a piecewise conversion illustratively implemented as an amplifier 900 coupled on an input side to the array of light sensitive devices 402 and coupled on an output side to an illustrative two linear analog-to-digital converters 902 and 904. The amplifier 900 in accordance with these embodiments has a gain response that is linear. To change the operational range of each linear analog-to-digital converter, a linear amplifier 906 and 908 are coupled between amplifier 900 and the respective linear analog-to-digital converters 902 and 904. Amplifier 900 may further have control inputs, such as a gain control 910 and a bias or offset control 912. The gain control 910 and offset control 912 may be either analog input values or digital input values. In the example case of analog input values, the gain control and offset control are coupled to a digital-to-analog output portion 714 of the processor 408 (such as when the processor 408 is a microcontroller or ASIC). In other cases, the analog values may be created by a digital-to-analog converter distinct from the processor 408, yet communicatively coupled to both the processor 408 and the amplifier 706. The processor (executing instructions) selectively controls contrast and/or brightness as discussed above, either automatically, or by interaction with the user.

Figure 10:
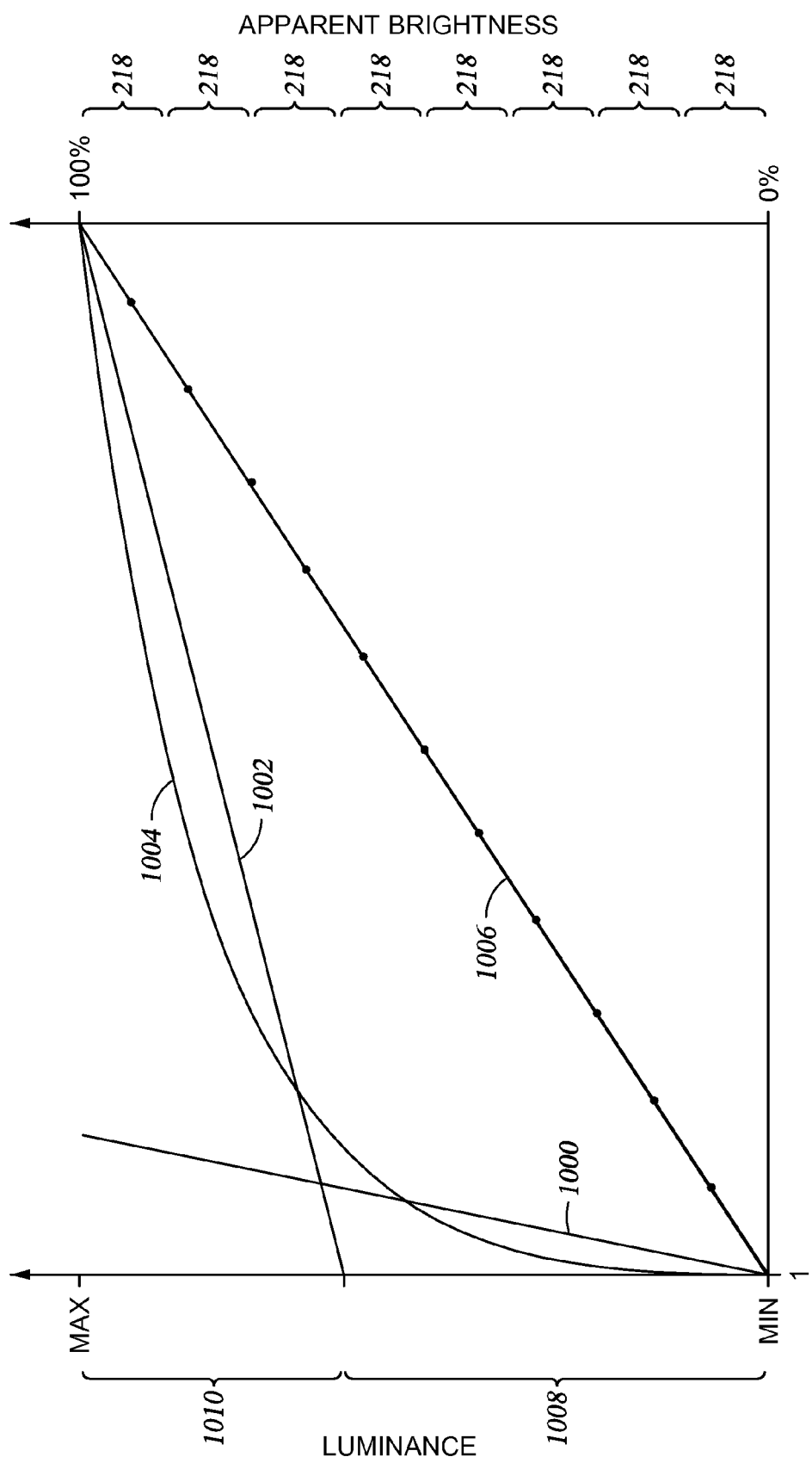
FIG. 10 shows a plot of luminance against digital luminance values, and also apparent brightness against digital luminance values, in accordance with at least some embodiments.

In order to discuss the piecewise logarithmic analog-to-digital conversion of the embodiments of FIG. 9, attention is directed to the graph of FIG. 10. In particular, FIG. 10 relates a luminance range (Y-axis on the left) against the range of possible digital luminance values (X-axis) by way of two solid lines 1000 and 1002, where the relationship is piecewise logarithmic (with a true logarithmic relationship shown in by solid line 1004). Co-plotted on the same graph is human perception of brightness (Y-axis on the right (with an arbitrary scale of 0 to 100%)) with respect to the digital luminance values (again, the X-axis) by way of dash-dot-dash line 1006.

In accordance with these example embodiments, the amplifiers 906 and 908 are adjusted such that their respective linear analog-to-digital converters are particularly sensitive to the depicted ranges of luminance. That is, for example, linear analog-to-digital converter 902 may be configured by way of amplifier 906 to be particularly sensitive to range 1008 (the lower luminance values, line 1000), and linear analog-to-digital converter 904 may be configured by way of amplifier 908 to be particularly sensitive to range 1010 (the upper luminance values, line 1002). To create the digital luminance values written to the image memory, for each element in the array of light sensitive elements the processor 408, executing instructions, reads both the linear analog-to-digital converters 902 and 904. In this example, when the processor determines the luminance value is above a predetermined threshold (i.e., the luminance is above a certain octave, in this example in octave 214 or above), the processor records the digital luminance value from the linear analog-to-digital converter 904. Likewise, when the processor determines the luminance value is below a predetermined threshold (i.e., the luminance is below a certain octave, in this example in octave 212 or below), the processor records the digital luminance value from the linear analog-to-digital converter 902. Stated otherwise, a first portion of the plurality of digital luminance values are read from the first linear analog-to-digital converter, and a second portion of the plurality of digital luminance values are read from the second linear analog-to-digital converter. In some cases, for overlap octaves (e.g., overlap octave 212 in the example of FIG. 10), the processor may choose either value, or combine the values in some way (e.g., averaging).

Though FIGS. 9 and 10 discuss only two linear analog-to-digital converters, it will be understood that three or more linear analog-to-digital converters may be used, and that better piecewise approximation of a logarithmic analog-to-digital conversion may take place. Likewise, in other embodiments a single linear analog-to-digital converter may be used, reading a first exposure at a first setting (e.g., lines 1000 in FIG. 10), and then reading a second exposure at a second setting (e.g., line 1002 of FIG. 10). While such a system may be operable for still life pictures, such may not be suitable for images where significant movement is present.

Figure 11:
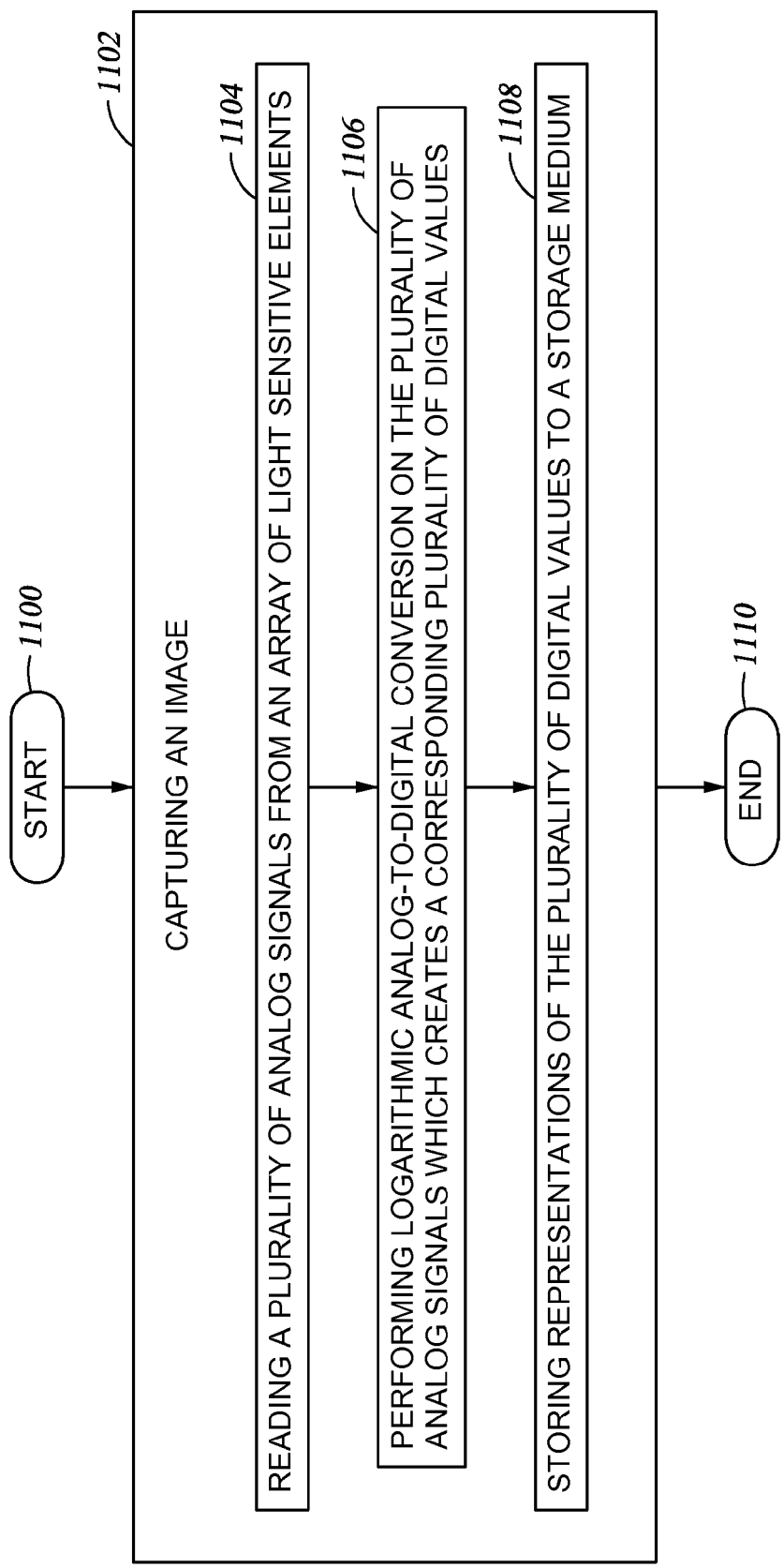
FIG. 11 shows a method in accordance with at least some embodiments.

FIG. 11 shows a method in accordance with at least some embodiments. The method may be performed, in whole or in part, by instructions executing on a processor. In particular, the method starts (block 1100) and proceeds to capture an image (block 1102) by: reading a plurality of analog signals from an array of light sensitive elements (block 1104); performing logarithmic analog-to-digital conversion on the plurality of analog signals which creates a corresponding plurality of digital values (block 1106); and storing representations of the plurality of digital values to a storage medium (block 1108). Thereafter, the method ends (block 1110), possibly to be restarted. The performing logarithmic analog-to-digital conversion on the plurality of analog signals which creates a corresponding plurality of digital values may take many forms using different types of physical devices, and includes cases where piecewise logarithmic analog-to-digital conversion is performed.

Audio Logarithmic A/D Conversion

The various embodiments discussed to this point have been in relation to capturing images of visual scenes; however, the logarithmic analog-to-digital conversion likewise finds use in capturing audio, such as associated with a video camera capturing a scene. In particular, human hearing is likewise logarithmic in nature, yet audio capture systems use linear analog-to-digital conversion to capture audio. The result is that higher amplitude (i.e., higher volume) "scenes" are oversampled in the same way as discussed above for visual images, and lower amplitude (i.e., lower volume) "scenes" are under-sampled in the same way discussed above. Thus, all the various embodiments discussed above may be extended to audio capture using a single or multiple microphones, the audio capture either concurrent with visual image capture, or standing alone. Moreover, the file storage format discussed above (less the color bits) may also be used to record the audio image to the image memory, with the understanding that what is stored for each audio channel is a time series of sample audio signals rather than a complete set of luminance values at the "same" point in time.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

References to "one embodiment," "an embodiment," "some embodiments," "various embodiments", "example embodiments" or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the types of cameras to which the various example embodiments may be applied comprise SLR cameras, point and shoot cameras, scientific cameras, medical cameras, automotive cameras, personal computer cameras, video cameras, and surveillance cameras. Also, it would be possible to invert the logarithmic conversion such that the highest digital values encode the darkest portions of the scene. It is intended that the following claims be interpreted to embrace all such variations and modifications.

What is claimed is:

1. A method comprising:
   capturing an image by
      reading a plurality of analog signals from an array of light sensitive elements;
      performing logarithmic analog-to-digital conversion on the plurality of analog signals which creates a corresponding plurality of digital values, each corresponding to a digital luminance value; and
   storing representations of the plurality of digital values to a storage medium;
   prior to the capturing the image:
      adjusting brightness by changing offset applied to the analog signals prior to analog-to-digital conversion; and
      adjusting contrast by changing gain applied to the analog signal prior to analog-to-digital conversion,
      wherein prior to adjusting brightness and adjusting contrast, the method further comprises capturing an image to create an initial image; and
         calculating a dynamic range regarding the initial image, the
         calculating performed by a processor executing a program; and
         wherein adjusting the brightness further comprises adjusting the brightness based on the dynamic range, the adjusting the brightness performed by the processor without user input; and
         wherein adjusting the contrast further comprises adjusting the contrast based on the dynamic range, the adjusting the contrast performed by the processor without user input.

2. The method of claim 1 wherein performing logarithmic analog-to-digital conversion further comprises:
   applying each analog signal to an amplifier whose gain response is logarithmic to create a modified signal; and then
   applying the modified signal to a linear analog-to-digital converter.

3. The method of claim 1 wherein performing logarithmic analog-to-digital conversion further comprises:
   performing piecewise logarithmic analog-to-digital conversion by
      sequentially applying each analog signal to a first linear analog-to-digital converter and simultaneously applying to a second linear analog-to-digital converter distinct from the first linear analog-to-digital converter;
      reading a first portion of the plurality of digital values from the first linear analog-to-digital converter; and
      reading a second portion of the plurality of digital values from the second linear analog-to-digital converter.

4. The method of claim 1
   wherein adjusting the brightness further comprises adjusting the brightness by a user by way of an interface device; and
   wherein adjusting the contrast further comprises adjusting the contrast by the user by way of an interface device.

5. The method of claim 1 wherein storing representations of the plurality of digital values further comprises storing, for each digital value, a combination of a value indicative of an octave and a value indicative of gradation within the octave.

6. The method of claim 1 wherein storing representations of the plurality of digital values further comprises storing, for at least one digital value, a combination of a value indicative of an octave, a value indicative of gradation within the octave, and a value indicative of a color.

7. The method of claim 1 wherein capturing the image further comprises capturing by at least one selected from the group consisting of: a mobile device; a mobile cellular device; a scanner; a copier; and a digital camera.

8. The method of claim 1 wherein reading further comprising reading from at least one selected from the group consisting of: an array of charge coupled devices (CCD); an array of complementary metal oxide semiconductor (CMOS) devices.

9. A system comprising:
a processor;
a program memory coupled to the processor, the program memory being a non-transitory computer-readable storage medium;
an array of light sensitive elements;
a means for performing logarithmic analog-to-digital conversion that defines an analog side and a digital side, the means for performing coupled to the processor on the digital side; and
an image memory coupled to the processor;
wherein the program memory stores a program that, when executed by the processor, causes the processor to capture an image by causing the processor to:
sequentially couple each light sensitive element of the array to the analog side of the means for performing; and concurrently
read a plurality of digital values corresponding to a signal associated with each light sensitive element; and
store a representation of the plurality of digital values to the image memory;
wherein the means for performing comprises an amplifier that defines an offset adjustment and a gain adjustment; and
wherein prior to capturing the image, the program further causes the processor to:
capture an initial image using the array of light sensitive elements and the means for performing;
determine a dynamic range of values in the initial image; and
at least one selected from the group consisting of—modify the offset adjustment of the amplifier based on the dynamic range of values without input from a user, and modify the gain adjustment of the amplifier based on the dynamic range of values without input from the user.

10. The system of claim 9 wherein
the amplifier produces an analog output signal logarithmically related to an analog input signal; and
a linear analog-to-digital converter coupled to the analog output signal of the amplifier.

11. The system of claim 9 wherein
the amplifier produces an analog output signal linearly related to an analog input signal; and
a logarithmic analog-to-digital converter coupled to the analog output signal of the amplifier.

12. The system of claim 9 wherein the means for performing further comprises:
a first linear analog-to-digital converter coupled to the amplifier; and
a second linear analog-to-digital converter coupled amplifier, the second linear analog-to-digital converter distinct from the first linear analog-to-digital converter;
wherein the processor reads a plurality of digital values corresponding to a signal associated with each light sensitive element, the program further causes the processor to:
read a first portion of the plurality of digital values from the first linear analog-to-digital converter; and
read a second portion of the plurality of digital values from the second linear analog-to-digital converter.

13. The system of claim 9 further comprising:
a display device coupled to the processor;
wherein
the program further causes the processor to:
using;
display the initial image on the display device; and
at least one selected from the group consisting of—modify the offset adjustment of the amplifier based on a command from a user, and modify the gain adjustment of the amplifier based on a command from the user.

14. The system of claim 9 further comprising:
a display device coupled to the processor;
a touch sensitive overlay associated with the display device, and the touch sensitive overlay communicatively coupled to the processor;
wherein the program further causes the processor to:
display the initial image on the display device; and
at least one selected from the group consisting of—modify the offset adjustment of the amplifier based on a command from a user received through the touch sensitive overlay, and modify the gain adjustment of the amplifier based on a command from the user received through the touch sensitive overlay.

15. The system of claim 9 wherein when the processor stores the representation of the plurality of digital values to the image memory, the program causes the processor, for at least one digital value, to:
store a first value in the image memory, the first value indicative of an octave; and
store a second value in the image memory, the second value indicative of a gradation within the octave.

16. The system of claim 15 wherein when the processor stores the representation of the plurality of digital values to the image memory, the program causes the processor, for each digital value, to store a value indicative of a color associated with the digital value.

17. The system of claim 9 wherein the processor, program memory, array of light sensitive elements, logarithmic analog-to-digital converter, and image memory are part of at least one selected from the group consisting of: a mobile cellular device; a digital camera; a scanner; a copier; and a digital camera.

18. The system of claim 9 wherein the array of light sensitive devices is at least one selected from the group consisting of: an array of charge coupled devices (CCD); an array of complementary metal oxide semiconductor (CMOS) devices.

* * * * *